US005628262A

United States Patent [19]

Nelson

[11] Patent Number: 5,628,262

[45] Date of Patent: May 13, 1997

[54] INTERSEEDING APPARATUS AND METHOD

[76] Inventor: John A. Nelson, 3229 S. 130th Cir., Omaha, Nebr. 68144

[21] Appl. No.: 657,308

[22] Filed: Jun. 3, 1996

[51] Int. Cl.$^6$ .......... B05B 3/18

[52] U.S. Cl. .......... 111/130; 239/727

[58] Field of Search .......... 47/57.1, 57.5, 47/57.6, 48.8; 111/125, 126, 128, 129, 130, 174, 200, 900, 905; 239/727, 728, 310, 317, 325; 222/133, 630; 221/211

[56] References Cited

U.S. PATENT DOCUMENTS

| | | | |
|---|---|---|---|
| 2,586,032 | 2/1952 | Haley | 97/47 |
| 4,062,305 | 12/1977 | Stoker | 111/1 |
| 4,084,522 | 4/1978 | Younger | 111/14 |
| 4,155,315 | 5/1979 | Dobbins | 111/128 |
| 4,181,241 | 1/1980 | Currah | 221/211 |
| 4,277,026 | 7/1981 | Garvey | 239/127 |
| 4,397,421 | 8/1983 | Schram | 239/710 X |
| 4,660,775 | 4/1987 | Ostrom et al. | 239/727 |
| 4,729,514 | 3/1988 | Ostrom et al. | 239/727 |
| 4,949,656 | 8/1990 | Lyle et al. | 111/174 |
| 5,161,473 | 11/1992 | Landphair et al. | 111/176 |

*Primary Examiner*—Terry Lee Melius
*Assistant Examiner*—Robert Pezzuto
*Attorney, Agent, or Firm*—John A. Beehner Law Offices

[57] ABSTRACT

An interseeder apparatus and method for dry broadcast distribution of seeds in conjunction with a center-pivot irrigation system. The interseeder apparatus comprises a storage container for storing a quantity of dry seed to be interseeded. The storage container is adapted to be mounted on a center-pivot irrigation system. A seed conveying device is employed for conveying the seed in a dry condition from the storage container outwardly from the storage container. A plurality of dispensing stations are positioned along the main water pipe. Each of the dispensing stations has a seed box for containing a quantity of dry seed, a discharge opening, seed delivery device in communication with the seed conveyer device for delivering a quantity of dry seed from the seed conveyer device into the seed box from the seed conveying device; seed metering device for regulating the discharge of seed from the discharge opening of the seed box; and distribution device in communication with the seed box for receiving seed discharged through the discharge opening by the metering device and broadcasting the seed therefrom. Finally, the apparatus has a device for activating the seed metering device and the distribution device, such that upon activation, a quantity of dry seed is discharged from the seed box and delivered to the distribution device for broadcast distribution.

12 Claims, 11 Drawing Sheets

INTERSEEDING APPARATUS AND METHOD

BACKGROUND OF THE INVENTION

1. Technical Field

The apparatus of the present invention relates generally to interseeding of crops. More specifically, it relates to an apparatus and method of interseeding crops utilizing a center-pivot irrigation system for support of the interseeding apparatus. A primary use, although by no means the only one, it to interseed soybeans into growing wheat. For example, alfalfa, cotton, sorghum, wheat or the like may also be interseeded using the apparatus and method of the present invention.

The invention describes an apparatus wherein a plurality of dispensing stations may be positioned and supported along the main water pipe of a center-pivot irrigation system. Each of the dispensing stations would be capable of the broadcast distribution of dry seeds. Such broadcast might be accomplished using centrifugal force or by use of an air assist wherein the seeds could be propelled using air pressure. As used in this specification, the term broadcast will mean distribution over a wide area, regardless of how that broadcast is effected.

As is well understood in the art, the term "interseed" is used to refer to planting one crop while the other is still standing. As mentioned, one primary use of this technique is interseeding soybeans into standing wheat. After the wheat have been harvested, the soybean crop remains to grow to maturity earlier than would be the case if planting was not commenced until after the wheat were harvested. This techniques artificially widens the "cropping season," permitting the technique to be used further north. Additionally, since soybeans are known to be "nitro-genus" crops, they restore some of the nitrogen to the soil which wheat naturally removes. Thus, in addition to economic incentives, interseeding provides substantial environmental benefits.

As mentioned, the interseeding apparatus of the present invention is adapted to be supported on a conventional center-pivot irrigation system. While the interseeder apparatus of the present invention requires the center-pivot system for support and movement across the field, there is no requirement that the water system be operating. Thus, while it is anticipated that the majority of time the water system will be operated when interseeding, it is not required.

2. Description of the Prior Art

The principles involved in interseeding are well known in the art. In fact the enhanced efficiency involved in such a operation has been a goal of farmers for some time. The transition from theory to practice however, has been difficult. Nevertheless several prior art device have been developed in an effort to practice this interseeding technique.

One such prior art device is disclosed in Ostrom, U.S. Pat. Nos. 4,660,775 and 4,729,514 which disclose a seeding means using a center-pivot irrigation system. This system utilizes a seeding system having an auxiliary water line supported on the main water line. In this embodiment, seeds suspended in the water in the auxiliary water pipe are sprayed out sprinklers, positioned at various points along the line. In another embodiment, the seeds are metered directly into the main water line. The principle of operation is the same except that the seeds suspended in the water are sprayed out through the main water sprinklers. Thus, in both embodiments of the Ostrom device, a "wet" distribution of seeds occurs, wherein the seeds are mixed in water prior to being distributed.

Another example of a prior art device is illustrated in Lyle, U.S. Pat. No. 4,949,656. Lyle discloses a seed distribution manifold for mobile span-and-tower irrigation systems. The seeds are suspended in water and travel in a piping system separate from the irrigation piping, to a manifold which is suspended from the overhead span section. Each manifold distributes seed and carrier water to a plurality of drop tubes. A valve is provided within the manifold to permit the manifold and discharge tube to be filled. A furrow is created by the impact of a high pressure water jet from another nozzle traveling just ahead of the seed drop tube. The valve may then be opened and the water and seed discharged into a planting shoe. There is no mention of a broadcast application. Rather, the seeds flow into the furrow through the tube. Thus, the Lyle patent involves planting of the seeds in narrow rows and not the broadcast distribution of seeds.

Consequently, it is a primary objective of the present invention to provide an interseeder apparatus and method for the broadcast distribution of dry seed.

An additional objective is to provide an interseeder apparatus and method which may be used in conjunction with a center-pivot irrigation system, either with or without the watering system operating.

Another objective is to provide an interseeder apparatus and method wherein a plurality of dispensing stations are positioned along the water arm of the center-pivot irrigation system and wherein the dispensing stations are positioned so as to ensure complete coverage of the area for planting.

Another objective is to provide an interseeder apparatus and method wherein the seeds for distribution are conveyed from a central storage container, positioned adjacent the center stand, to each of the distribution positions.

Another objective is to provide an interseeder apparatus and method wherein the means for conveying the seed from the storage hopper to the dispensing stations and between stations can be any of a number of types such as auger or various types of conveyer.

Another objective is to provide an interseeder apparatus and method wherein the seed may be broadcast using a centrifugal force effect.

Another objective is to provide an interseeder apparatus and method wherein the seed may be broadcast using an "air-assist" effect provided by an air nozzle.

SUMMARY OF THE INVENTION

An interseeder apparatus for dry broadcast distribution of seeds in conjunction with a center-pivot irrigation system, the center-pivot irrigation system having a center tower, a main water pipe extending radially therefrom and adapted for circular rotation about the center tower. The interseeder apparatus comprises a storage container for storing a quantity of dry seed to be interseeded. The storage container is adapted to be mounted on a center-pivot irrigation system. A seed conveying means is employed for conveying the seed in a dry condition from the storage container outwardly from the storage container. A plurality of dispensing stations are positioned along the main water pipe. Each of the dispensing stations has a seed box for containing a quantity of dry seed, a discharge opening, seed delivery means in communication with the seed conveyer means for delivering a quantity of dry seed from the seed conveyer means into the seed box from the seed conveying means; seed metering means for regulating the discharge of seed from the discharge opening of the seed box; and distribution means in communication with the seed box for receiving seed discharged through the discharge opening by the metering means and broadcasting the seed therefrom. Finally, the apparatus has a means for activating the seed metering means and the distribution means, such that upon activation, a quantity of dry seed is discharged from the seed box and delivered to the distribution means for broadcast distribution.

The seed conveying means may comprise an auger or a plurality of conveyer assemblies each having an elongated hollow tube through which the seed is conveyed. An elongated cable would form a closed loop and be adapted to pass through and around the tube. A plurality of circular disks would be spaced along and secured to the cable and adapted to receive a quantity of dry seed in the space between the disks. The disks would have a diameter approximating the inside diameter of the tube, such that upon circulation of the cable through the tube, the disks are operative to move seed disposed therebetween through the tube.

The distribution means may comprise a spinner suspended below the distribution box and having a plurality of arms extending radially from the center thereof. Each of the arms may comprise vertical and horizontal portions defining an L-shape. The spinner is adapted to receive a quantity of seed from the seed box thereon, such that upon rotation of the spinner, the radially extending arm contacts the quantity of seed propelling it outwardly by centrifugal force.

The distribution means may further comprise an air pressure means for expelling air under pressure, positioned adjacent the spinner and directed at the horizontal surface of the spinner arm such that upon rotation of the spinner by the motor, each of the arms is brought into communication with the high pressure air whereupon seeds deposited on the horizontal surface of the arms are propelled outwardly therefrom.

The dispensing station metering means may include a shutter adapted to adjustably cover the discharge opening, the means for activating the metering means may include a means for adjusting the degree to which the shutter opens the discharge opening, such that seed is discharged from the box in proportion to the opening.

The seed conveying means and the seed delivery means may further comprise inflow and outflow tubes and an overflow tube connecting the inflow and outflow tubes, the overflow tube being positioned at least partially within the seed box and having an opening in the overflow tube positioned to communicate a quantity of seed into the seed box until the box is filled and further such that upon the filling, the opening would be blocked causing the seed in the seed overflow tube to bypass the opening and travel to the outflow tube and onto the next dispensing station, the seed conveying means thereby permitting a sequential filling of the plurality of dispensing stations.

The invention also includes a method of interseeding a crop in conjunction with the operation of a center-pivot irrigation system. The method would include providing a center-pivot irrigation system having a center tower with a main water pipe extending radially therefrom providing the interseeder apparatus. A quantity of dry seed for planting would be placed in the storage container. The irrigation system may be activated so as to pivot the main water pipe around the field. A quantity of seed from the storage hopper would be communicated to the plurality of dispensing stations. The dispensing station metering means would be activated whereby a quantity of dry seed is dispensed from the seed box onto the dispensing means for broadcast distribution from each of the dispensing stations eb;normal.

DESCRIPTION OF THE PREFERRED EMBODIMENT

Figure 1:
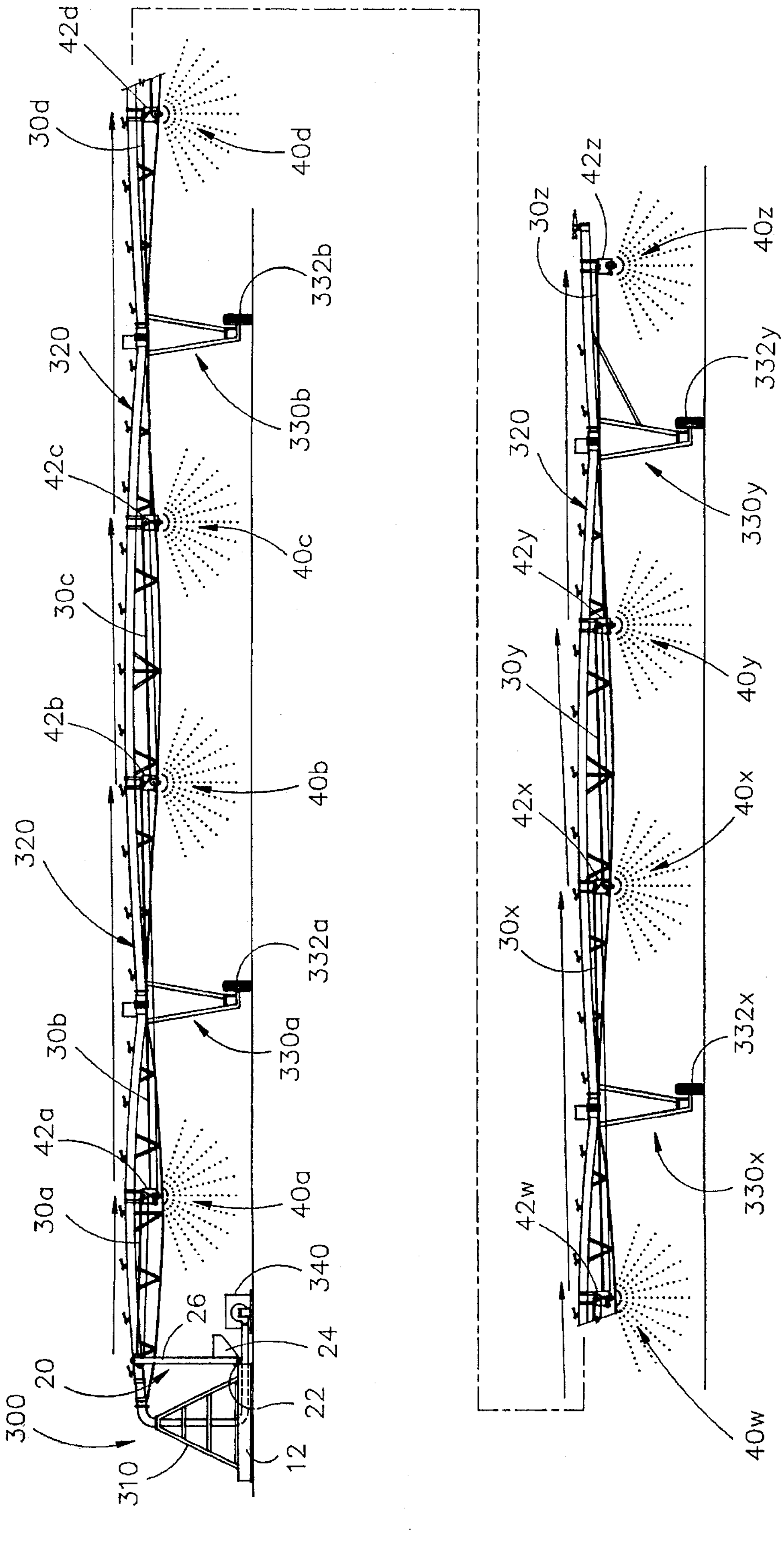
FIG. 1 is a side view of the interseeder apparatus of the present invention installed on a conventional center-pivot irrigation system.

FIG. 1 is a side view of the interseeder apparatus 10 of the present invention installed on a conventional center-pivot irrigation system 300. As seen in the figure and well understood in the art, the conventional center-pivot irrigation system 300 comprises a center tower 310 positioned at approximately the center of the field, or area being irrigated. Connected to the center tower 310 is the main water pipe 320. The main water pipe 320 is connected on one end to the top of center tower 310 and extends outwardly therefrom. As is well understood in the art, the main water pipe 320 can extend for several hundred feet. Therefore, due to the weight of the pipe 320, intermediate supports 330 provide support at various points along its length. Several of these supports 330*a–x* are shown in the figure. Finally, a more substantial final support 330*y* is positioned at the end of the pipe as shown in the figure.

As will be well understood by those in the art, the water is forced up through the center tower 310 and out the water pipe 320 to a plurality of spray nozzles (not shown) distributed along the length of the main water pipe 320 by pump 340. Water is then sprayed from these nozzles as the water pipe 320 is moved in a circular fashion about the center tower. Thus, the center-pivot irrigation system 300 is able to effectively water a circular area. The interseeding apparatus of the present invention is adapted to "piggy-back" on this irrigation operation. However, it is important to note that operation of the interseeder is not dependent on operation of the water system. Rather, the interseeder is designed to operate both with and without operation of the irrigation water system.

As seen in the figure, the interseeder apparatus of the present invention comprises a plurality of dispensing stations 40*a–g*, positioned along the main water pipe 320 of the center-pivot irrigation system 300. The spacing of the dispensing stations 40*a–g* would be governed by the broadcast distribution pattern and density to be achieved by the dispensing means, as discussed in more detail below. The dispensing stations 40*a–g* would likely be spaced such that the seed distribution patterns overlap just slightly. It is envisioned that in most embodiments, the dispensing stations would be positioned approximately midway between the intermediate support towers 330*a–c*. However, in some situations, in order to achieve the desired distribution, it may be necessary to position more than one dispensing station between the intermediate supports. In any case, the functioning of the dispensing stations is the same.

In the preferred embodiment, each dispensing station would comprise a receptacle 42 such as a box or the like, into which the seeds are communicated. A means would be positioned within each box 42 for controlling the communication of seed into box 42 and between dispensing stations. The metering means would be operative to initially achieve a filling of box 42, after which incoming seed would be passed to the next station in the sequence. At least one distribution means 46 would be associated with each box 42 for the purpose of dispensing the seeds communicated to the box. In a preferred embodiment, distribution means 46 comprises a pair of broadcast wheels 46*a* and 46*b*. Finally, an activation means 48 would be associated with each distribution means 46 and operative to activate the distribution means thereby effecting a broadcast distribution of seeds.

A plurality of seed conveying means 130*a–g* is used to convey the seeds from a central storage hopper 24 to each of the dispensing stations box 40. As described in more detail below, an additional seed conveyor means 28 is operative to communicate the seeds from the central storage hopper 24 to the first seed conveying means 130*a*. Although not shown in the figure, it contemplated that a "shut-off" switch would be installed after the final dispensing station along the main water pipe 320 so that in the event seed is conveyed past the final station, distribution from the main hopper may be shut off until the excess seed is dispensed, allowing the dispensing to catch up with the conveyance from the main hopper.

Throughout the specification, individual examples and components thereof are designated with a, b, c, etc. Therefore, it should be understood that use of the number alone is meant to refer to the element generally, as opposed to any one example specifically. For example, the conveying means generally may be referred to with the reference numeral 130 whereas a specific segment may be referred to as 130*a*.

As mentioned, an important feature of the present invention is the metering function provided by the design of the seed delivery means which is operative to automatically sense when a specific dispensing station box 42 is full. Upon detection of such a status, the incoming seeds are deferred to the next station. Automatic metering is best illustrated in the front sectional view of FIG. 6.

Figure 2A:
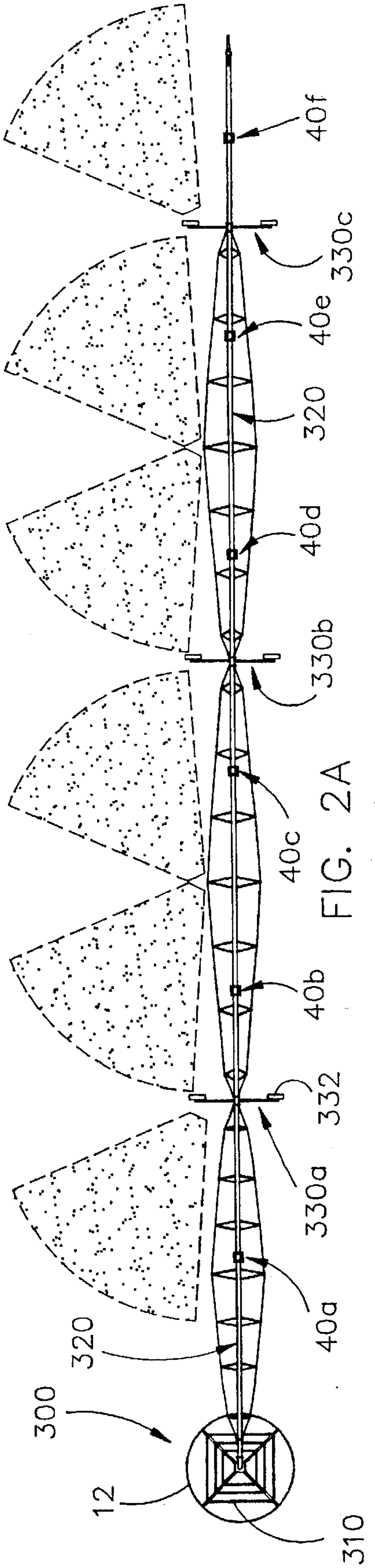
FIGS. 2*a–c* and 3*a–c* are top views of different seeding patterns using the interseeding apparatus.
Figure 2B:
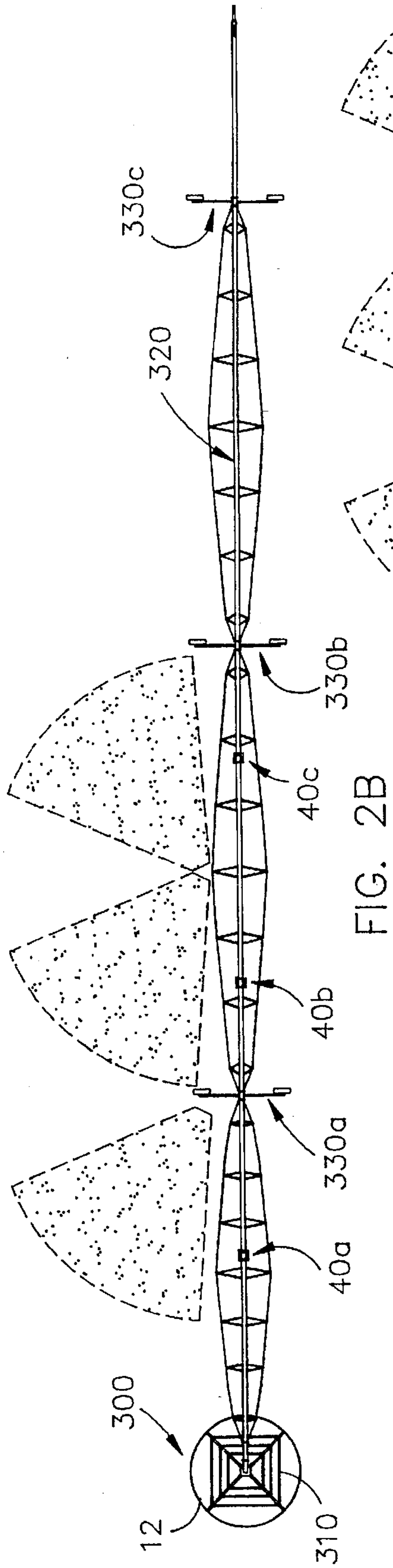
Figure 2C:
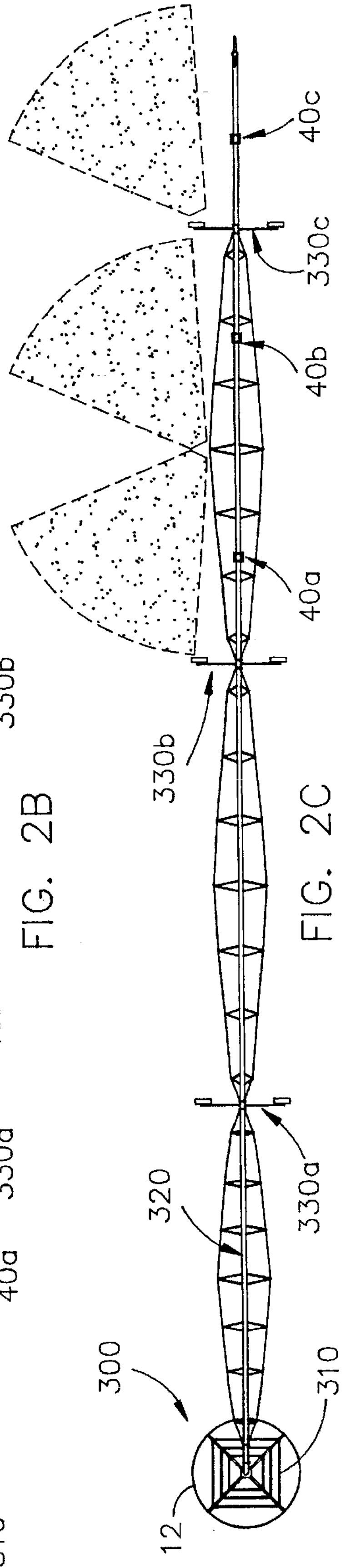

FIGS. 2*a*, 2*b* and 2*c* are top views showing two embodiments of the present invention. As seen in the top view of FIG. 2*a*, seed dispensing stations 40*a–f* are distributed along the length of the main water pipe 320 of center-pivot irrigation system 300. In the embodiment of FIG. 2*a*, each of the dispensing stations dispenses seed during the circular travel of the water pipe. Thus, the entire field is interseeded at one time. FIGS. 2*b* and 2*c* represent a second embodiment of the invention. In this embodiment, three dispensing stations 40*a–c* are used to seed the field. In this embodiment, the dispensing stations are first positioned on the inner half of water pipe 320. The pipe is then rotated about the center, interseeding the inner half of the field. The dispensing stations are then moved to the outer half of the center pipe length, and the outer half of the field is then interseeded. Thus, in the embodiment of FIGS. 2*b* and 2*c*, the interseeding is a two-step process. However, only half of the number of dispensing stations of the FIG. 2*a* embodiment are required.

Figures 3A, 3B, 3C:
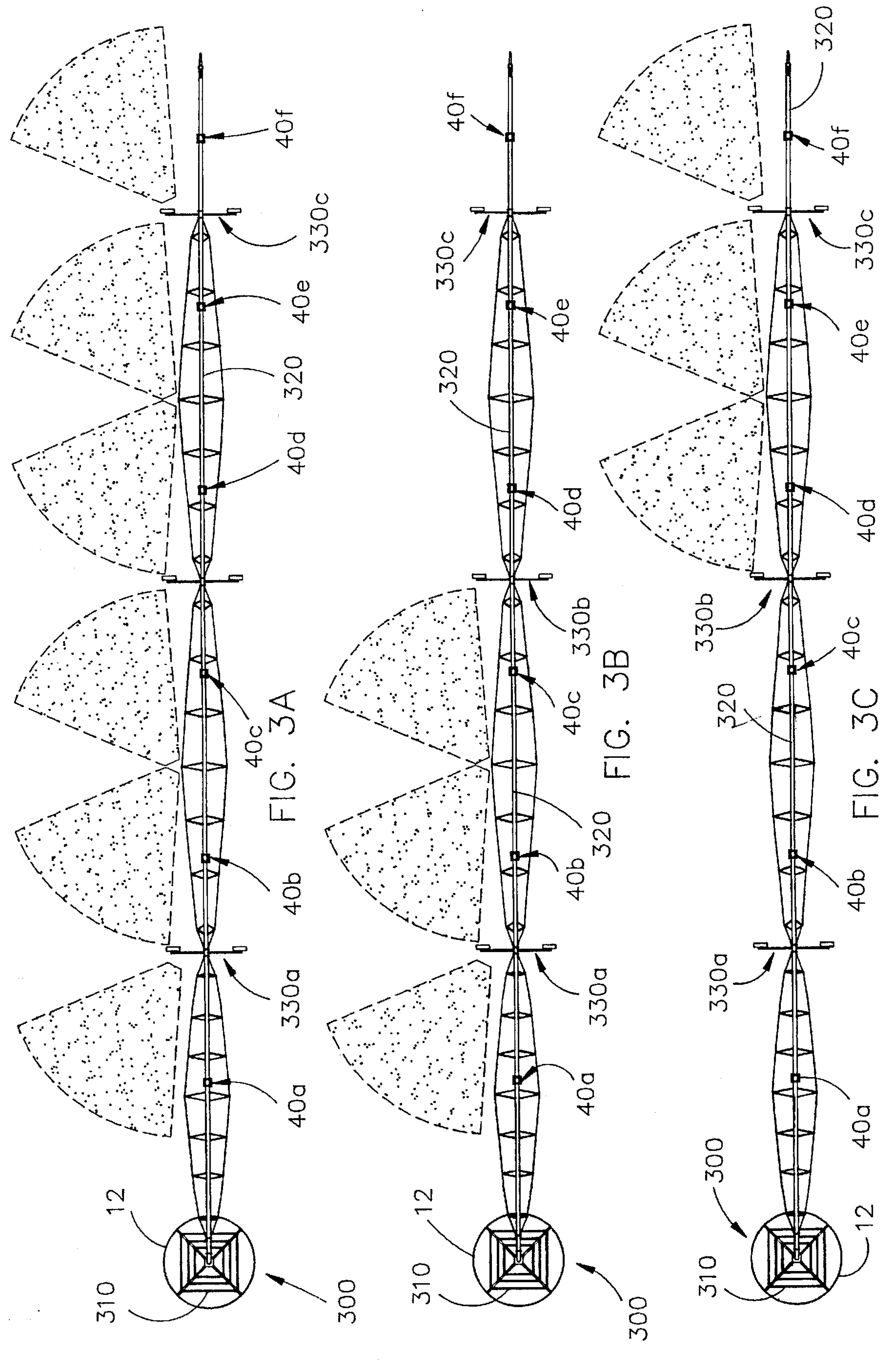

FIGS. 3*a*, 3*b* and 3*c* are top views of the interseeding apparatus illustrating yet another alternative embodiment. In some circumstances, there will be an occasional need to interseed only a portion of the field. In that case, it may be desirable to leave all the dispensing stations in place and activate only those stations necessary. In the embodiment of FIGS. 3*b* and 3*c*, all six dispensing stations 40*a–f* are installed along the length of main water pipe 320. However, only the desired dispensing stations are dispensing seed at any given time. For example, as illustrated in FIG. 3*b*, three innermost dispensing stations 40*a–c* are operated during one revolution of the irrigation system. In other cases, the innermost distribution boxes may be turned off and three outermost distribution boxes 40*d–f* operated while the center-pivot irrigation system is rotated. Thus, any portion of the field is may be interseeded, using this process.

Figure 4A:
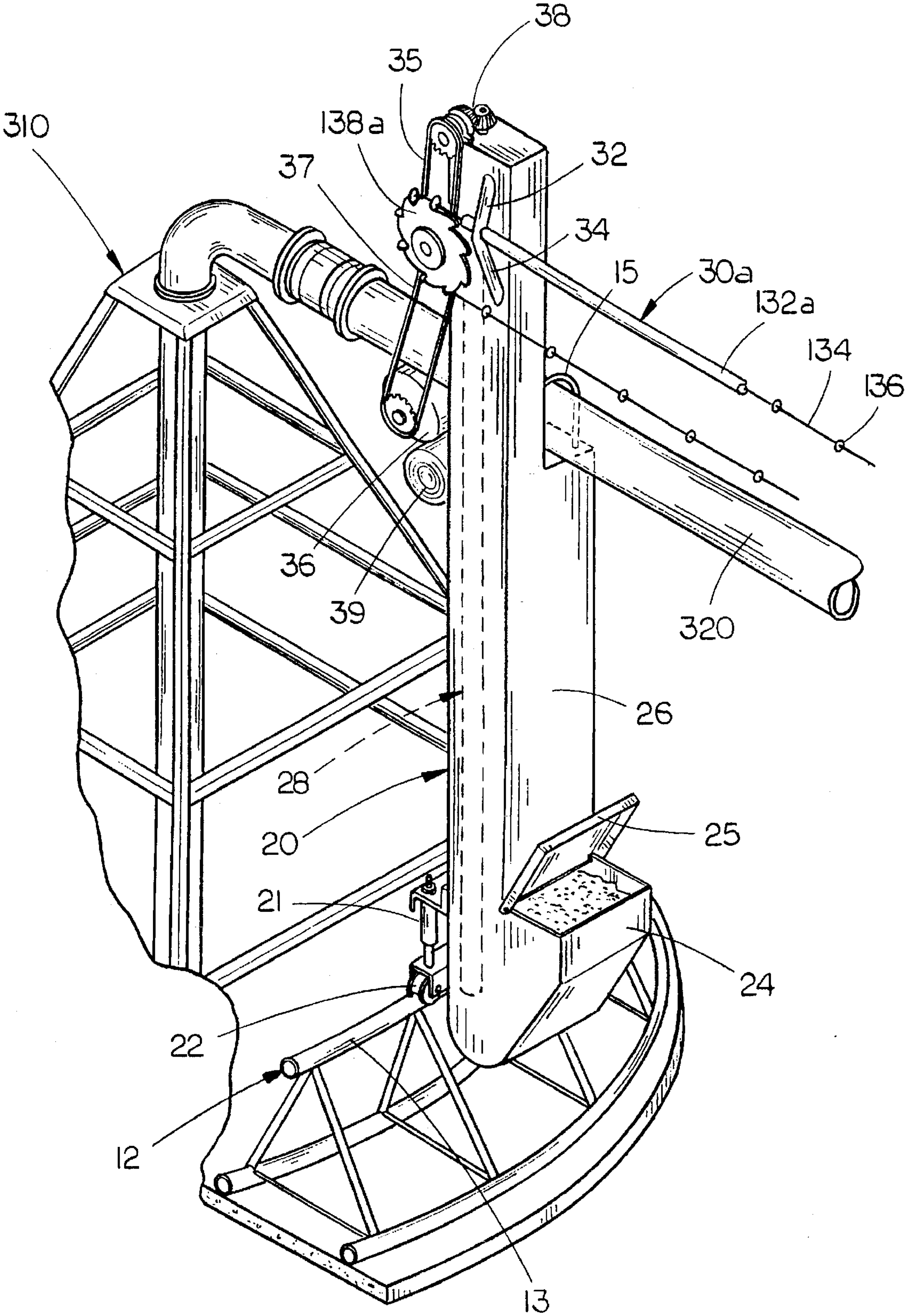
FIGS. 4*a* and 4*b* are perspective and rear sectional views of the main seed storage hopper and one method of conveying seed from the main hopper the dispensing stations.

FIG. 4*a* is a perspective view of the seed storage hopper and the conveyor means used to convey the seed from thee storage hopper to the first, and consecutive, dispensing stations. As seen in the figure, a seed hopper 24 is positioned at the lower end of a conveyor housing 26. The seed hopper 24 is provided with an opening into which the seed for seeding would be introduced into the hopper. A lid 25 is adapted to cover the hopper, minimizing the opportunity for rain or other contaminants to enter the hopper. The entire seed storage container 20 is adapted to be supported on a support structure 12 by means of wheels 22 which are adapted to roll along the top of rim 13 thereby providing a means for a 360° rotation of seed storage container 20 about center tower 310. Wheels 22 are connected to housing 26 through a plurality of shock absorbers 21. These shock absorbers provide a means for accommodating any perturbations in the level of support rim 13. Additional support for housing 26 is provided by means of bracket 15 which is adapted to be placed around main water pipe 320 of the center-pivot irrigation system.

An internal conveying apparatus 28 indicated in hidden lines in FIG. 4*a* is used to transport the seed from seed hopper 24 at the base of the storage container to the top of the container for transport to the various dispensing stations. In a preferred embodiment, this internal conveying apparatus 28 is a screw auger. As seen in the figure, a rotating disc 138*a* is positioned adjacent the top of storage container 20. An inlet tube 32 is operative to convey the seed from internal conveying means 28 into distribution tube 132*a*. As more fully described below, the rotation of drive wheel 138*a* is operative to convey the seed dropped through inlet tube 32 into tube 132*a* to the first dispensing station 40 (FIG. 5). In the event that more seed is communicated through tube 32*a* than can be conveyed outwardly through tube 132*a*, an outlet tube 34 is provided to communicate any excess seed back into housing 26 whereupon this excess seed will fall to the bottom of housing 26 and recycled through the container. As seen in the figure, the rotation of drive wheel 138*a* and the activation of internal conveyor 28 is accomplished using motor 36 which is secured to the back side of housing 26. A belt 37 is used to connect the motor to drive wheel 138*a*. A further drive belt 35 is used to connect the drive wheel shaft to a gear and sprocket arrangement 38 positioned at the top of the housing. This gear and sprocket arrangement 38 is, in turn, connected to screw auger 28 as shown more clearly in FIG. 4*b*. Thus, motor 36 is also operative to rotate auger 28 in addition to conveyor means 30*a*. Finally, air compressor 39 is also secured to the back of conveyor housing 26. As described in more detail below, air compressor 39 provides a source of compressed air which may be used in assisting the dispensing and disbursement of seeds from the dispensing stations.

Figure 4B:
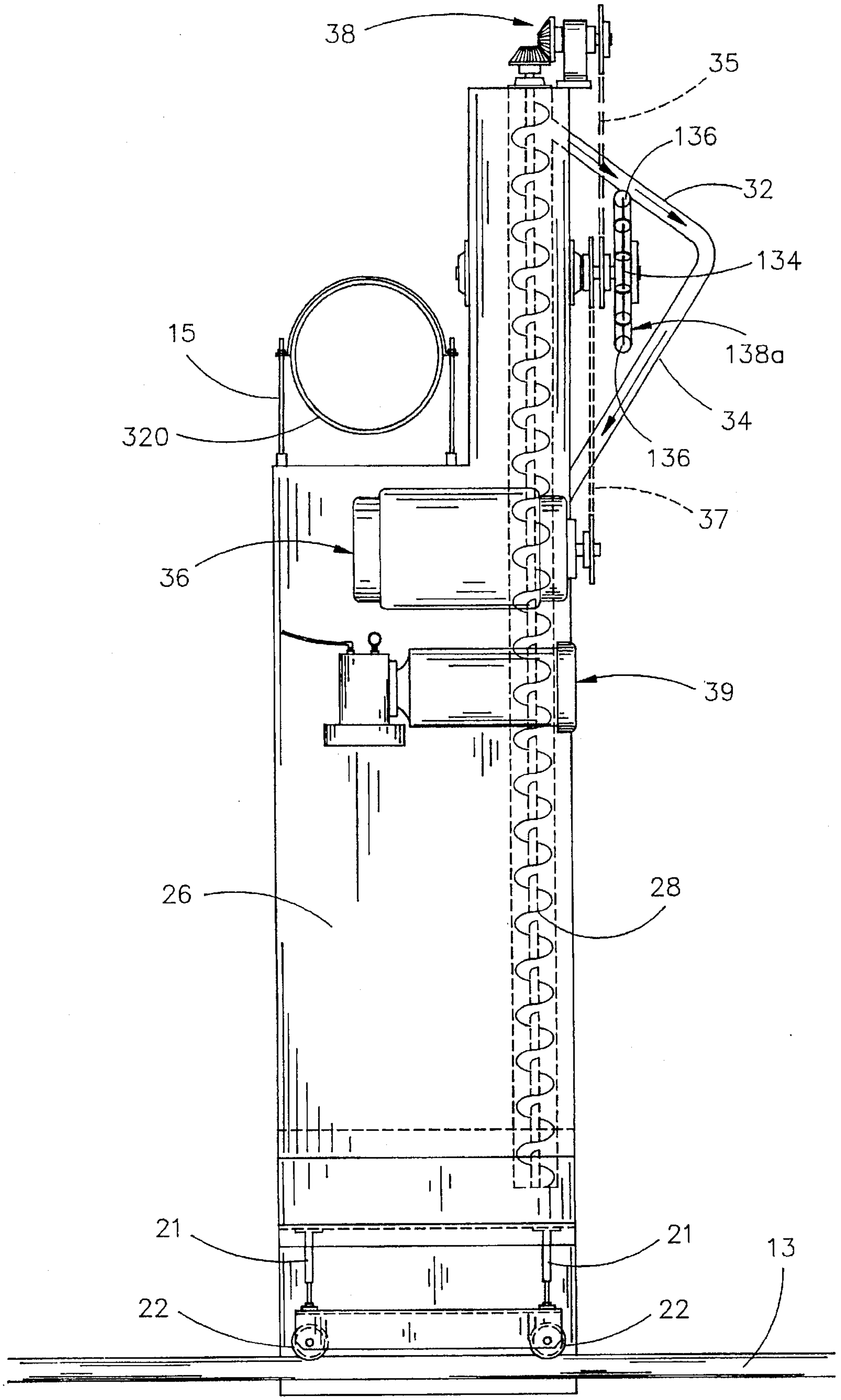
Figure 5:
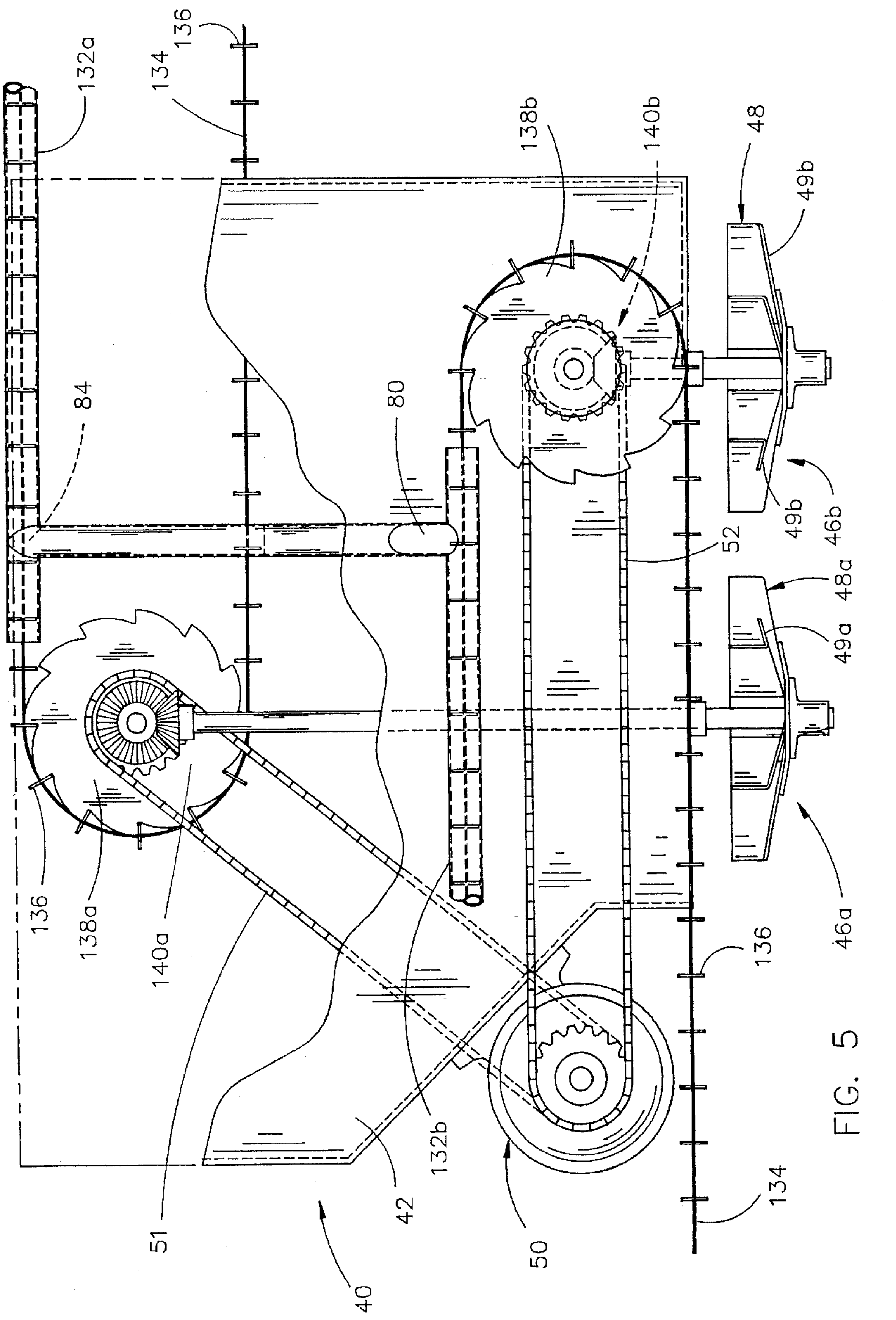
FIGS. 5 and 6 side and front sectional views of a dispensing station for the interseeder apparatus showing in particular the dispensing and driving means and the means for conveying the seed to and from the station.

FIG. 4*b* is a rear view of seed storage container 20. Shown especially well in this view is internal conveyor auger 28 which is used to transport the seed from hopper 24 at the base of housing 26 to the top of the housing wherein the seed may be transferred into conveyor tube 132*a* for transport to the first dispensing station as discussed above. Also well illustrated in this view are inlet and outlet tubes 32 and 34, respectively, used to communicate the seed conveyed from hopper 24 into tube 132*a*. As seen by the direction arrows in the figure, this seed would travel from the top of housing 26 through inlet tube 32. Since the top of conveyor tube 132*a* is open at the point where the inlet tube 32 intersects conveyor tube 132*a*, a quantity of seed will be deposited in tube 132*a*. It will also be observed from the figure that inlet tube 32 is sufficiently large that some space exists between conveyor tube 132*a* and the top of inlet tube 32. This additional space provides a means by which any excess quantity of seed transported down tube 32 but which is unable to be accommodated in conveyor tube 132*a* can be recycled. As seen in the figure, this excess seed continues to travel down tube 32 to the junction with tube 34. Outlet tube 34 provides a means for returning this excess seed into conveyor housing 26, whereupon the returned seed will fall back into hopper 24 to be recycled. Also seen in this view is the connection of gear and sprocket arrangement 38 at the top of housing 26 to auger 28. As mentioned above, gear and sprocket 38 is connected to drive motor 36 by means of belts 35 and 37 and is operative to rotate auger 28 upon activation of motor 36.

Also seen in FIG. 4*b* is bracket 15 which, as mentioned, is used to stabilize the position of storage container 20 relative to main water pipe 320 of center-pivot irrigation system 300. Finally, the figure illustrates wheels 22 which are used to permit the rotation of storage container 20 about support 12. As mentioned, wheels 22 are adapted to run along support rim 13 of support 12, thereby permitting the rotation of seed storage container 20 about center tower 310. As also mentioned above, shock absorbers 21 provide a means for smoothing out the travel of the storage container around rim 13.

Figure 6:
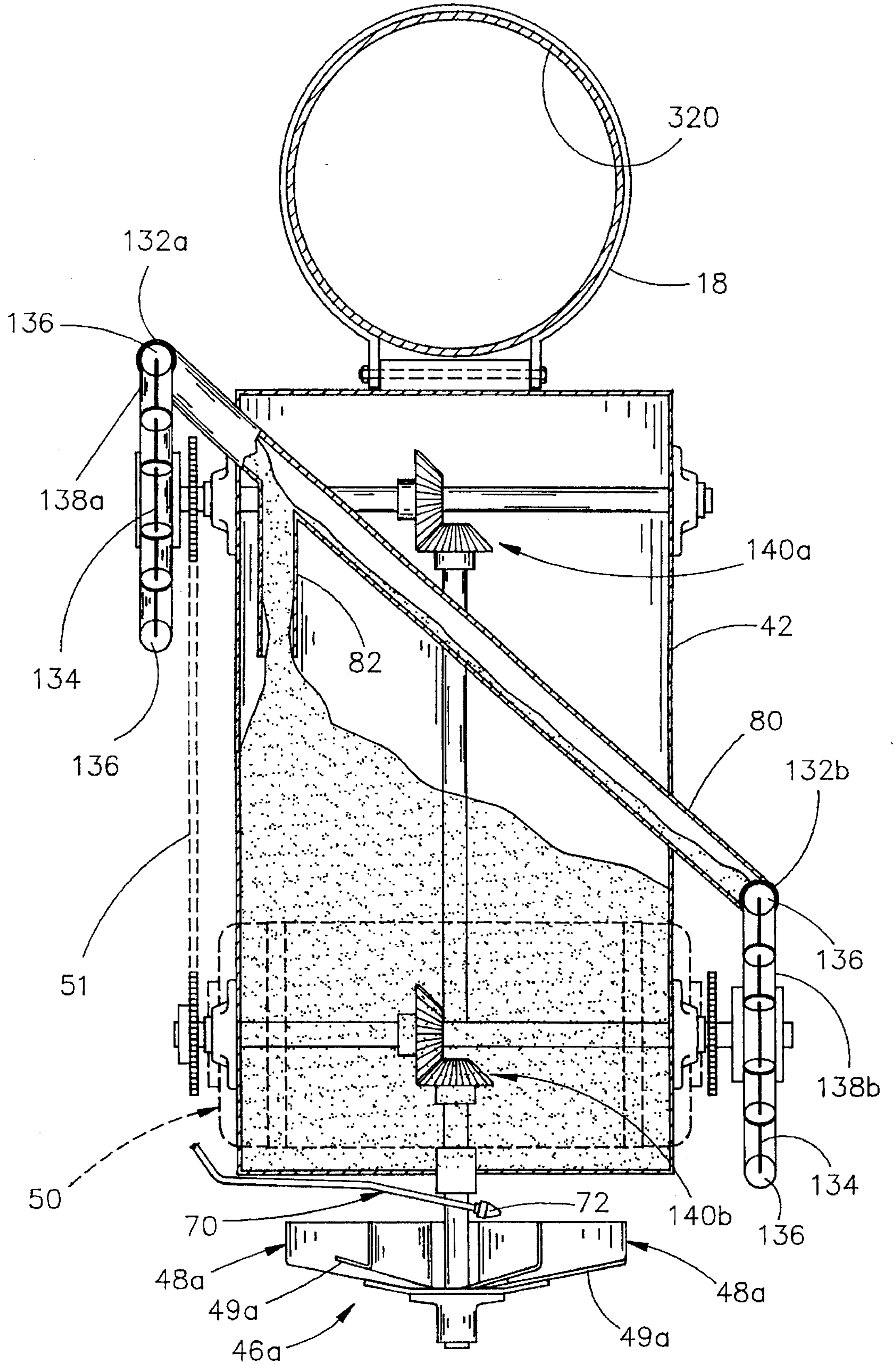

FIGS. 5 and 6 are side and end views, respectively, of a dispensing station 40. As mentioned above in connection with FIGS. 1–3*c*, a plurality of dispensing stations 40 are positioned radially outwardly on main water pipe 320 of center-pivot irrigation system 300. It is these dispensing stations 40 which serve to distribute and dispense the seed as the center-pivot arm is rotated on the field. As seen in FIGS. 5 and 6, a main feature of dispensing station 40 is seed box 42. It is seed box 42 into which a quantity of seed to be dispensed, flows. In a preferred embodiment of the invention, the seed for distribution is conveyed in a sequential fashion from storage hopper 20, positioned adjacent center tower 310, outwardly to each succeeding dispensing station 40.

Two preferred means for conveying the seed from the storage hopper outwardly to each succeeding dispensing station are contemplated. In a first preferred embodiment, as illustrated in FIGS. 1–6, this means for conveying the seed comprises a hollow tube running between the storage hopper and the first dispensing station and between each succeeding dispensing station. As explained above, these hollow tubes 132 are adapted to receive a wire cable 134 forming a closed loop through and around tube 132. Along the length of cable 134 are a plurality of circular disks 136. These circular disks 136 are secured to cable 134 such that upon circulation of cable 134, disks 136 would be moved lengthwise along the inside of tube 132. Disks 136 are of a circumference approximating the inside diameter of tube 132. Therefore, any seed distributed along the inside of tube 132, between successive disks, would also be urged lengthwise along the inside of tube 132 upon circulation of cable 134, due to contact of the seed with disk 136. Additionally, in order to effect a communication of seed from storage hopper 20 to the first and successive dispensing stations, there must be provided a means for introducing the seed to be conveyed. In the present invention, this means for introducing the seed into tube 132 is provided through an intersection of tubes, creating openings through which seed may be communicated.

As has already been discussed in connection with FIGS. 4*a* and 4*b* above, such a means for communicating seed into tube 132*a* is provided by intersecting tube 132*a* with inlet tube 32. Similarly, a seed delivery means may be defined in connection with dispensing station 40, as illustrated in FIGS. 5 and 6, by incoming tube 132*a* intersecting cross tube 80, defining an orifice 84. As cable 134 is circulated through tube 132*a*, the seed positioned between successive disks 136 is urged down tube 132*a* until encountering orifice 84. Since tube 80 is directed generally downwardly, any seed encountering orifice 84 will fall inside of tube 80. It will be observed from the view of FIG. 6 that inlet tube 82 intersects with cross tube 80, thereby defining another orifice 83. As shown in the figure, as the seed travels downwardly in tube 80, it encounters orifice 83. Since tube 82 is directed downwardly from tube 80, gravity causes a quantity of seed to be communicated into tube 82. As shown in FIG. 6, tube 82 is open at the bottom so that any seed communicated into the tube will fall into box 42.

As long as box 42 is not filled with seed, seed entering tube 82 will fall into box 42. Once box 42 is filled with seed, at least to the level of the base of tube 82, tube 82 will begin to fill up, substantially closing off orifice 83, thereby resisting the further communication of any seed into tube 82. As shown in the figure, once orifice 83 has been closed off, the overflow seed will travel down the remaining portion of tube 80. The base of tube 80 in turn intersects with outgoing tube 132*b* of the dispensing station at which point another orifice is created. Thus, any overflow seed traveling downwardly through tube 80 beyond tube 82 will be communicated into outgoing tube 132*b*. As mentioned above, in a preferred embodiment, dispensing means 46 comprises a broadcast spinner. Such a spinner would likely comprise a plurality of generally L-shaped arms 48 each having horizontal 49 and vertical 47 surfaces. The seed falling into output tube 132*b* from cross tube 80 is urged along tube 132*b* in the manner previously discussed.

As discussed above, the circulation of cable 134 through tube 132 is accomplished by engagement of disks 136 with notches 39 in drive wheels 138. Notches 39 are constructed such that they are operative to engage disks 136. Thus, rotation of the wheel causes disk 136 to be engaged by a respective notch 39 and pulled along with the rotation of the wheel, thus effecting a circulation of cable 134. It will be observed in FIG. 5 that the two drive wheels 138*a* and 138*b* are driven by motor 50 using belts 51 and 52 connecting motor 50 to wheels 138*a* and 138*b*, respectively. Additionally, this connection between motor 50 and drive wheels 138*a* and 138*b* provides a means for activating dispensing means 46*a* and 46*b* positioned adjacent the bottom of distribution box 42.

As illustrated in the figure, dispensing wheels 46*a* and 46*b* are connected to drive wheels 138*a* and 138*b*, respectively, by means of worm gears 140*a* and 140*b* attached to the end of a shaft upon which the respective dispensing wheel is mounted. Thus, rotation of respective drive wheels 138*a* and 138*b* is operative to rotate the respective dispensing wheel.

Finally, illustrated on FIG. 6 is another important alternative feature of the invention wherein an air assist may be provided, enhancing the distribution of seed from a dispensing wheel 46. As seen in FIG. 6, and described in more detail below, an air nozzle 72 is positioned above a dispensing wheel 46 and directed in such a way that a high-pressure air stream from nozzle 72 is directed downwardly on horizontal surface 49 of each of the L-shaped arms 48 comprising dispensing wheel 46. Thus, any seed dispensed through dispensing slit 60 (FIG. 8) in the base of box 42 will be deposited onto the horizontal surface 49 of one of the dispensing wheel arms 48. The air from nozzle 72 is directed onto horizontal surface 49 such that upon the depositing of seed onto this horizontal surface, the air from nozzle 72 will be incident upon the seed, propelling it outwardly in reaction thereto. This outward propulsion by air from nozzle 72 is in conjunction with and in addition to the centrifugal acceleration of the seed provided by the rotation of wheel 46. This combination generally enhances the broadcast distance of the seed while maintaining the general distribution pattern illustrated in FIGS. 2*a–c* and FIGS. 3*a–c*.

Figure 7:
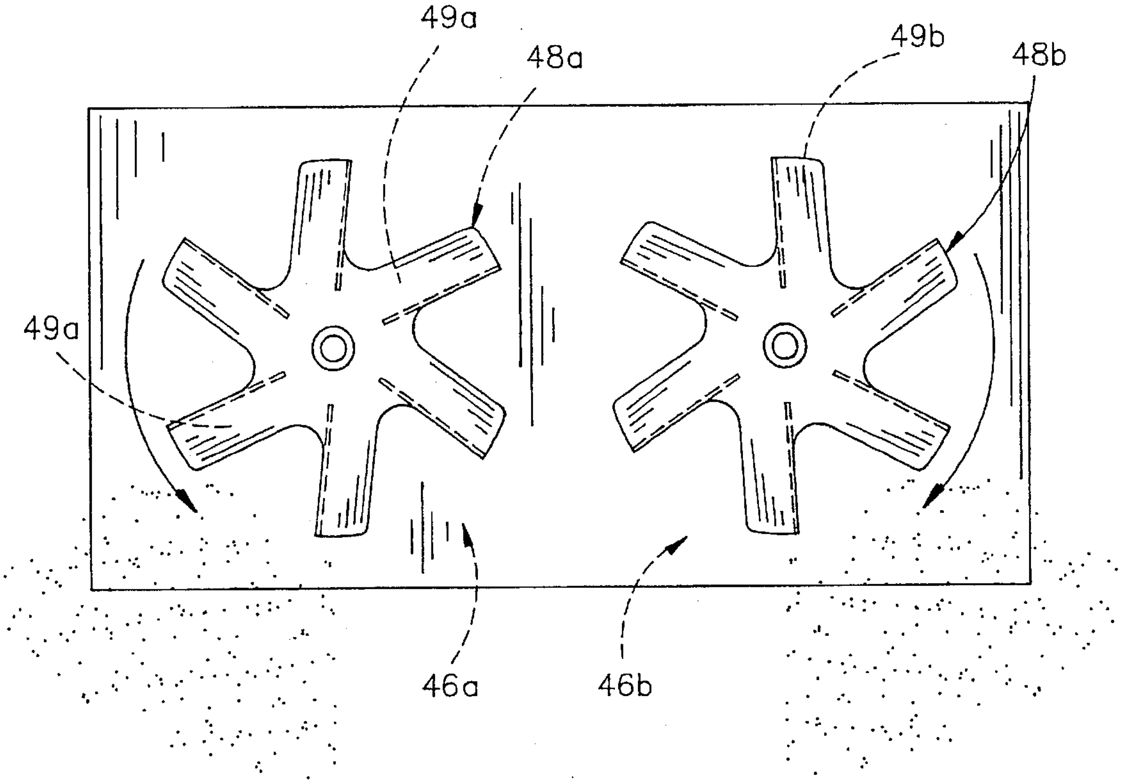
FIGS. 7 and 8 are top and bottom views, respectively, of a dispensing box showing the preferred dispensing wheel and a means for controlling the flow of seed out of the dispensing box.
Figure 8:
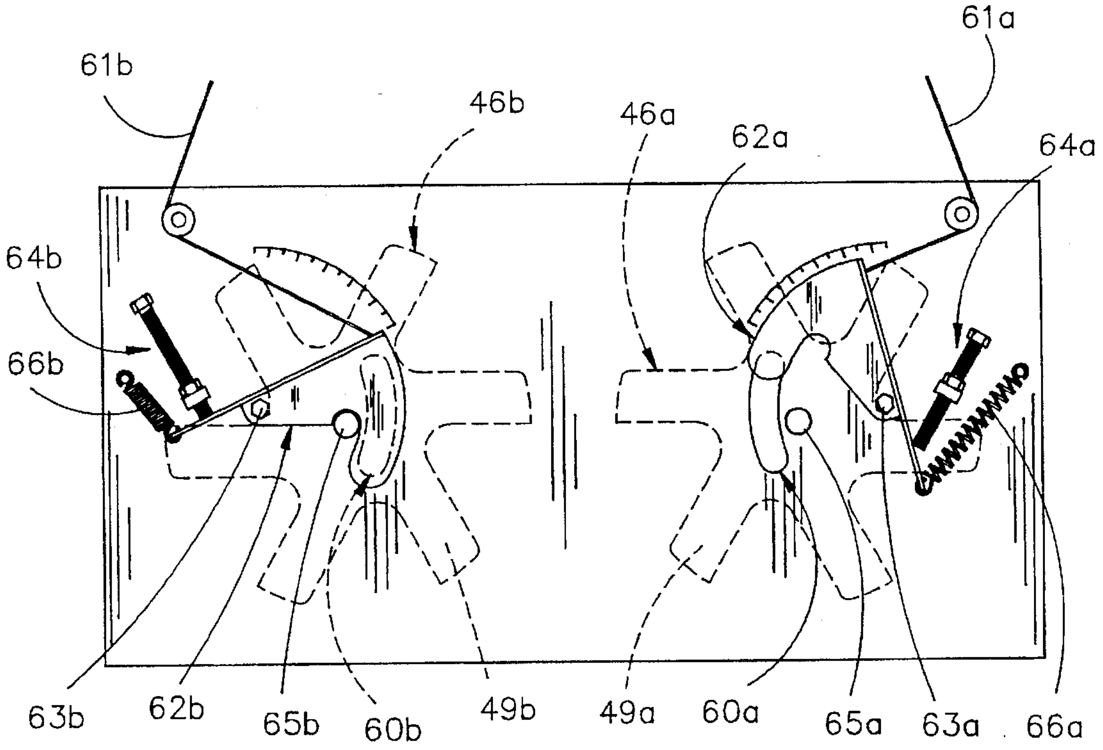

FIGS. 7 and 8 are top and bottom views, respectively, of the bottom of distribution box 42. FIG. 7 is a view looking down from the top onto the bottom of box 42 with dispensing wheels 46*a* and 46*b* shown in hidden lines and their direction of rotation indicated with arrows. Illustrated clearly in the figure are the plurality of horizontal surfaces 49 comprising the wheels.

FIG. 8 is a view looking up at the bottom of box 42 showing dispensing wheels 46*a* and 46*b* in phantom lines so as to illustrate the flow control means utilized for controlling the release of seed from the box. As seen in the figure, box 42 has a dispensing slit 60*a* and 60*b* associated with a respective one of dispensing wheels 46*a* and 46*b*. These dispensing slits provide a means for discharging seed out the bottom of the box. Additionally, each of the two slits 60*a* and 60*b* has associated therewith a seed metering means such as shutters 62*a* and 62*b* adapted to be slidably moved over the respective window. The windows 62*a* and 62*b* are adapted for continuous movement and thus the amount of coverage of slit 60*a* and 60*b* is also continuously variable. By controlling the degree to which slits 60*a* and 60*b* are covered by windows 62*a* and 62*b*, the flow rate of seed from the box, and consequently the density of the seeding, may be controlled.

Those skilled in the art will recognize that there are many means available for controlling the sliding movement of windows 62*a* and 62*b*. In a preferred embodiment, a solenoid (not shown) may be used as a means for activating the seed metering means by controlling the opening and closing of the window. Springs 66*a* and 66*b* are also associated with windows 62*a* and 62*b*, to provide a biasing force on the windows. As illustrated, the springs are connected at a point opposite the window pivot point 63*a* and 63*b* from wire 61*a* and 61*b*. Thus, when power is removed from the solenoid, and tension in wires 61*a* and 61*b* relaxed, springs 66*a* and 66*b* pivot windows 62*a* and 62*b* back into the closed position, as illustrated by window 62*b*. Finally, window opening stops 64*a* and 64*b* may be associated with each of the windows, providing a means for controlling the maximum extent to which the slit is opened when the solenoid is in the "on" position. In one preferred embodiment, these stops may be a simple nut and bolt arrangement. These bolts would control the degree to which the slit is opened by controlling the maximum degree to which the window may be moved.

As mentioned above, the opening and closing of dispensing slits 60*a* and 60*b* by shutters 62*a* and 62*b* are controlled by a solenoid (not shown). Shutters 62*a* and 62*b* are connected to the solenoid by means of wires 61*a* and 61*b*. Upon activation of the solenoid, wire 61*a* or 61*b* may be pulled, causing the respective shutter to be pivoted about point 63*a* or 63*b* as shown on the right side of FIG. 8. As shown, this application of tension on wire 61*a* will also cause a stretching of biasing spring 66*a*. Since the tension in line 61*a* is greater than the force of spring 66*a*, shutter 62*a* will be maintained in the open position as shown. Once the tension on line 62*a* has been relaxed, shutter 62 will pivot back into the closed position as indicated in the left side of FIG. 8. As seen in that figure, shutter 62*b* has pivoted back into the closed position and spring 66*b* is shown in the relaxed position. As shown in the figure, a stop 65*a* and 65*b* is provided as a means for stopping shutter 62*a* and 62*b* once it has closed off the respective dispensing slit 60*a* or 60*b*.

Figure 9:
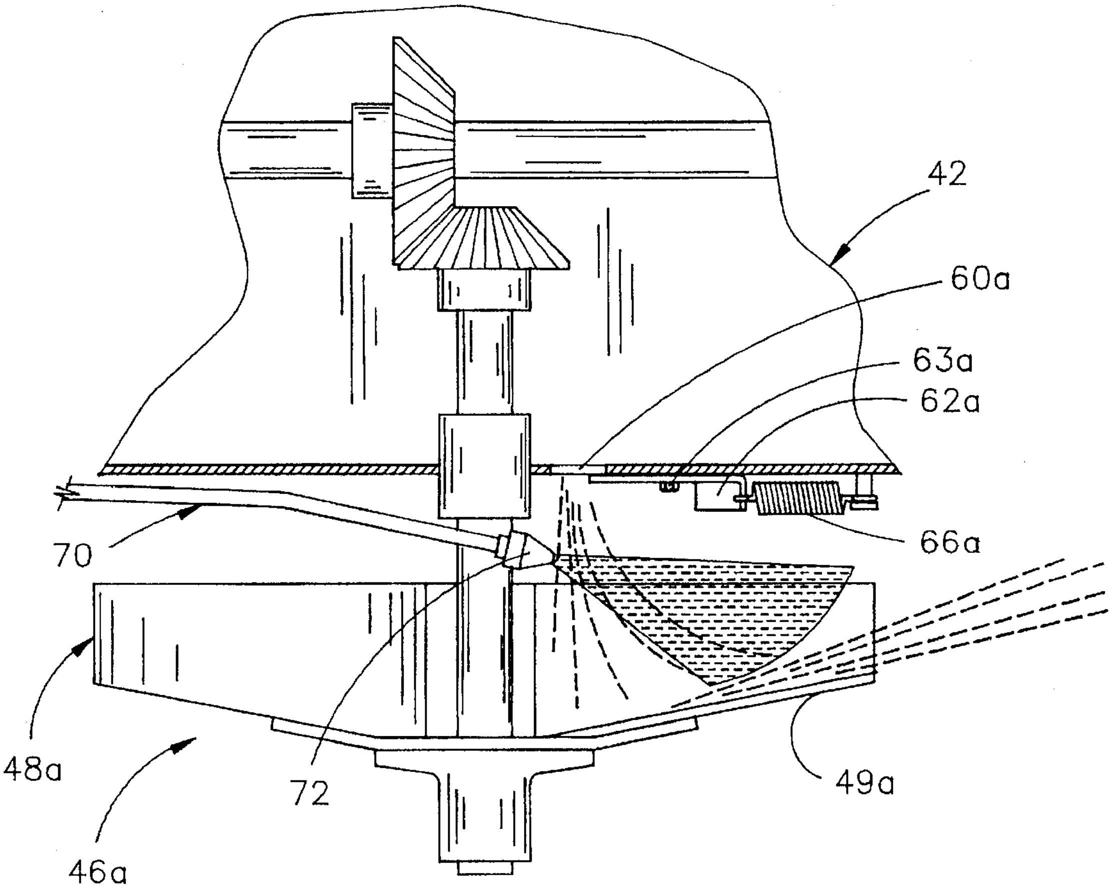
FIG. 9 is a perspective view of an alternative embodiment of the dispensing means wherein an air nozzle may be utilized to assist in the dispensing of seed from the station.

FIG. 9 is a part-sectional view showing an enlargement of one of dispensing wheels 46*a* and illustrating an important enhancement to the invention, namely associated air assist apparatus 70. As seen in the figure, nozzle 72 of air assist apparatus 70 is positioned generally above dispensing wheel 46*a* as shown. Nozzle 72 is directed at an oblique angle to the horizontal portion 49*a* of arms 48*a* of dispensing wheel 46. As has already been discussed above, the seed discharged from slit 60*a* will fall onto horizontal surfaces 49 comprising arms 48 as wheel 46 is rotated.

Nozzle 72 is fixed in position relative to rotating dispensing wheel 46. Therefore, as wheel 46 rotates about its axis, successive arms 48 and associated horizontal surfaces 49 will be brought into incidence with the compressed air emanating from nozzle 72. The angle of incidence of nozzle 72 towards horizontal surface 49 is such that upon the alignment of horizontal surface 49 with nozzle 72, any seed residing on horizontal surface 49 will be projected outwardly upon such alignment. The precise angle of incidence of the compressed air emanating from nozzle 72 upon horizontal surface 49 is not critical. Rather, it is only important that the angle be such that the effect of the compressed air incident on the horizontal surface is to project the seed outwardly therefrom. It is important that the seed be deposited on horizontal surface 49 prior to encountering the high-pressure air flow emanating from nozzle 72. Therefore, the nozzle is positioned several degrees of rotation later than the position of slit 60 relative to horizontal surface 49. Therefore, the seed may drop from the box through slit 60 onto horizontal surface 49 prior to encountering the high-pressure air emanating from nozzle 72.

Again, the precise number of degrees rotation between slit 60 and air nozzle 72 is not critical so long as it permits sufficient time, based on the rotational speed of wheel 46, for the seed to be deposited on horizontal surface 49. As mentioned above, the combination of the air assist provided by air nozzle 72 and the centrifugal force provided by the rotation of wheel 46 will produce a generally circular distribution pattern as indicated above in connection with FIGS. 2 and 3.

Figure 10:
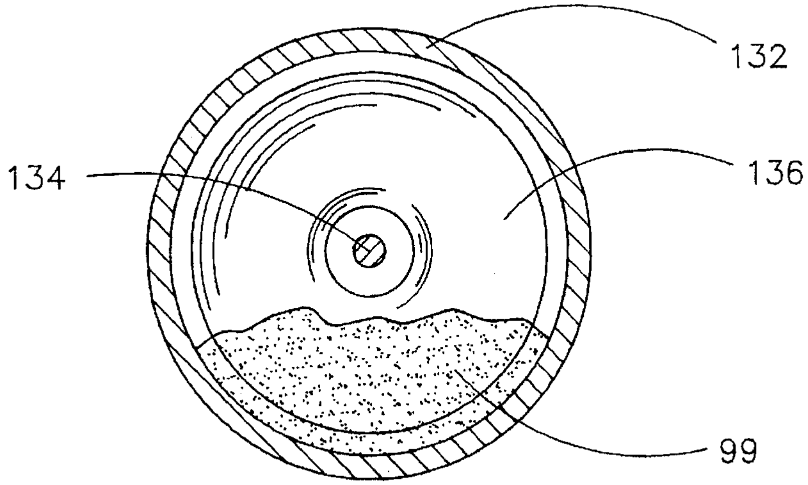
FIG. 10 is a cross-sectional, end-on view of one embodiment of the conveying means illustrating the cylindrical pipe and a disk used to move the seed therethrough.

FIG. 10 is a cross-sectional view of one of seed conveying means tubes 132 showing how circular disks 136 and cable 134 to which they are attached are arranged within the hollow interior of tube 132. As seen in this figure, circular disks 136 have a diameter approximating that of the inside of tube 132. Furthermore, the disks 136 are oriented such that they lie in a plane generally perpendicular to the longitudinal axis of tube 132. Therefore, seed 99 being disposed between consecutive disks 136 will be urged through tube 132 as cable 134 is circulated.

Figure 11:
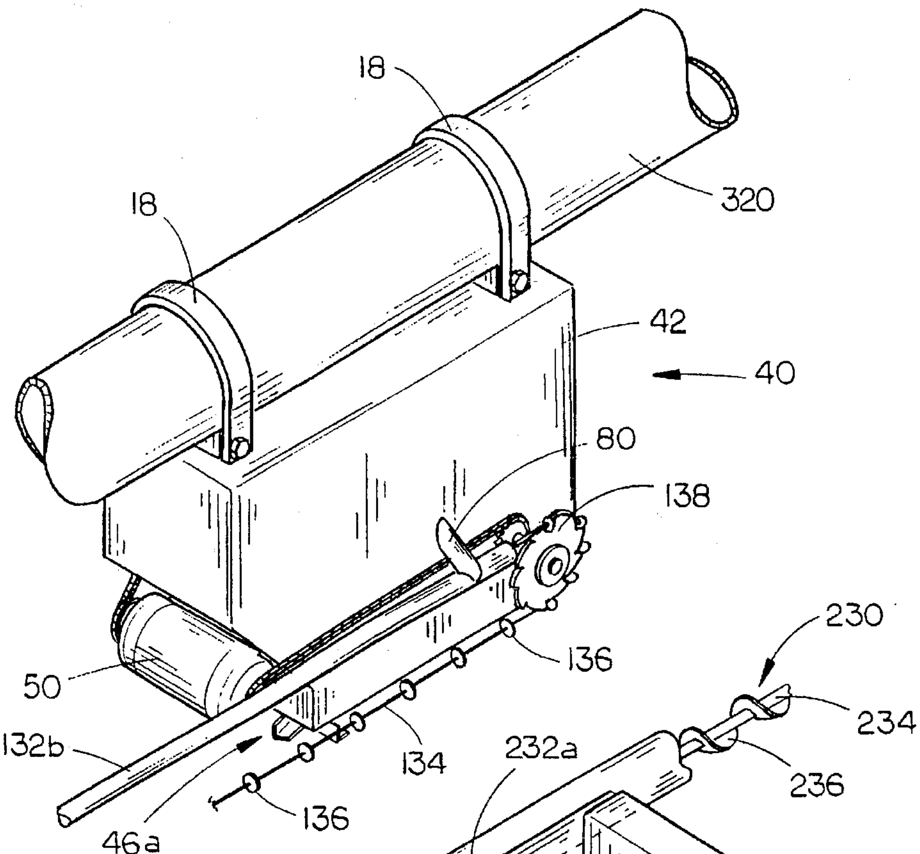
FIG. 11 is a perspective view of a dispensing station for the interseeder apparatus showing in particular the attachment of the dispensing box to the irrigation system's main water pipe.

FIG. 11 is a perspective view of a dispensing station 40 showing its securement to main water pipe 320. As seen in the figure, a preferred method for securing dispensing station 40 to main water pipe 320 is by using a pair of brackets 18 which would be looped around water pipe 320 and fastened on each end to the top of dispensing station box 42 as shown. Also seen in the perspective view of FIG. 11, is the end portion of cross feed tube 80 protruding from the sidewall of distribution box 42. As mentioned above, it is this cross feed tube 80 which transfers seed from incoming tube **132*a* to outgoing tube 132*b*, once box 42 has been filled with seed. As seen in this figure, and as has been described above, the intersection of the cross feed tube 80 with outgoing tube 132. This intersection defines an orifice which permits the deliverance of the seed from the cross feed tube 80 into the outflow tube 132*b*. Also seen in this perspective view is the operation of the seed conveying means used to convey the seed through tube 132*b* to the next succeeding distribution box. This functioning is identical to that described above wherein a plurality of circular disks 136 are secured to wire cable 134*b* which is circulated through tube 132*b* by means of drive wheel 138*b*. As has already been discussed, a plurality of notches 39 in drive wheel 138 are adapted to engage the plurality of disks 136 during its rotation, thereby causing wire 134*b*** to circulate.

Figure 12:
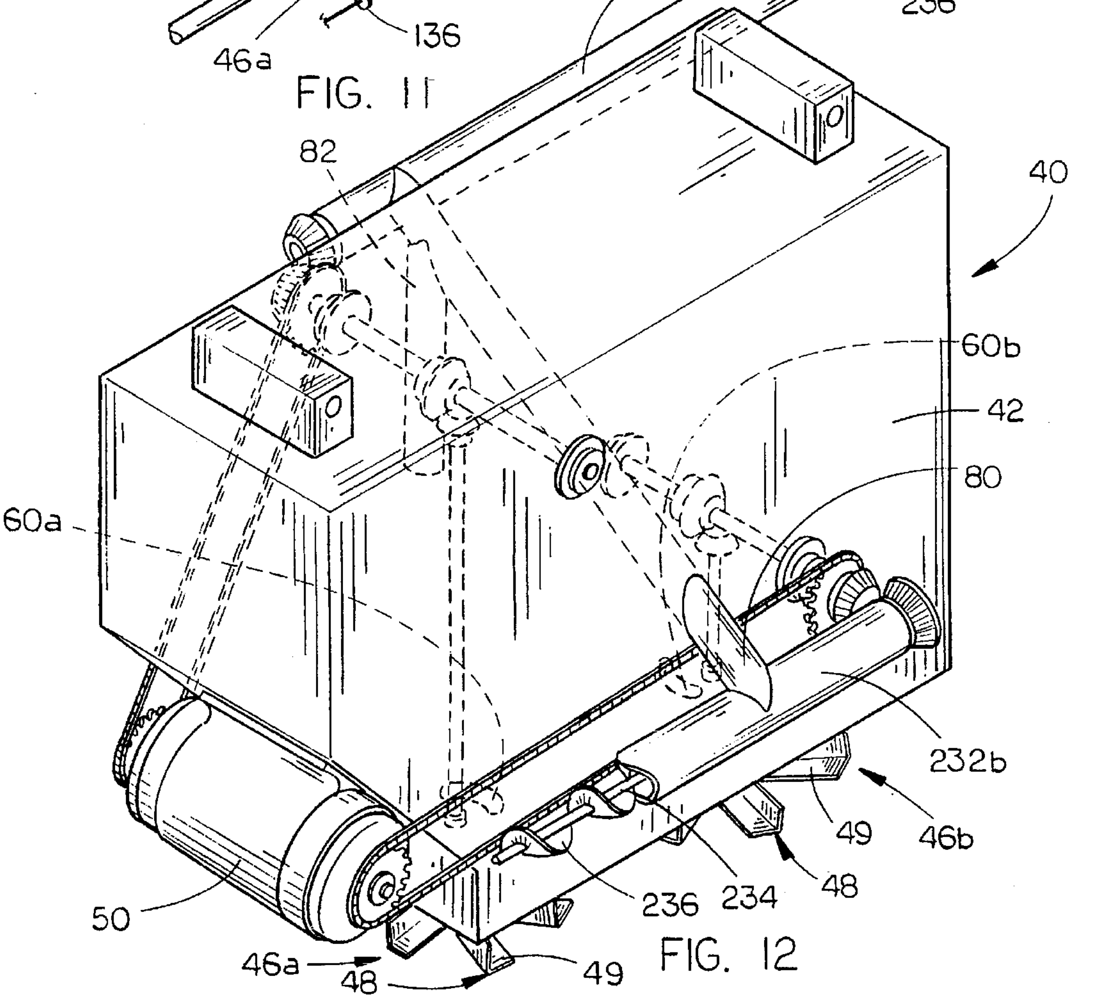
FIG. 12 is a cross-sectional perspective view of a dispensing station showing the internal workings thereof and in particular the connection to the incoming and outgoing seed conveying means.

FIG. 12 is another perspective view of a dispensing station showing in this case an alternative preferred embodiment for the seed conveying means. In this embodiment, the cable and disk system described above has been replaced by an auger 230. As seen in the figure, auger 230 comprises a drive shaft 234 to which is connected spiral flighting 236. Rotation of the shaft thus causes the rotation of the spiral flighting and the conveyance of seed disposed therebetween, down tube 232 in the normal fashion. As in the earlier embodiments, each dispensing station, except for the final station, would have both incoming and outgoing auger seed conveying means 230. For example, as shown in FIG. 12, an incoming auger conveyor 23 would deliver seed to dispensing station 40 and an outgoing auger conveying means **230*b* would deliver the excess seed to the next sequential dispensing station. In all other respects, seed dispensing station 40** would receive and distribute the seed in the fashion described above.

Figure 13:
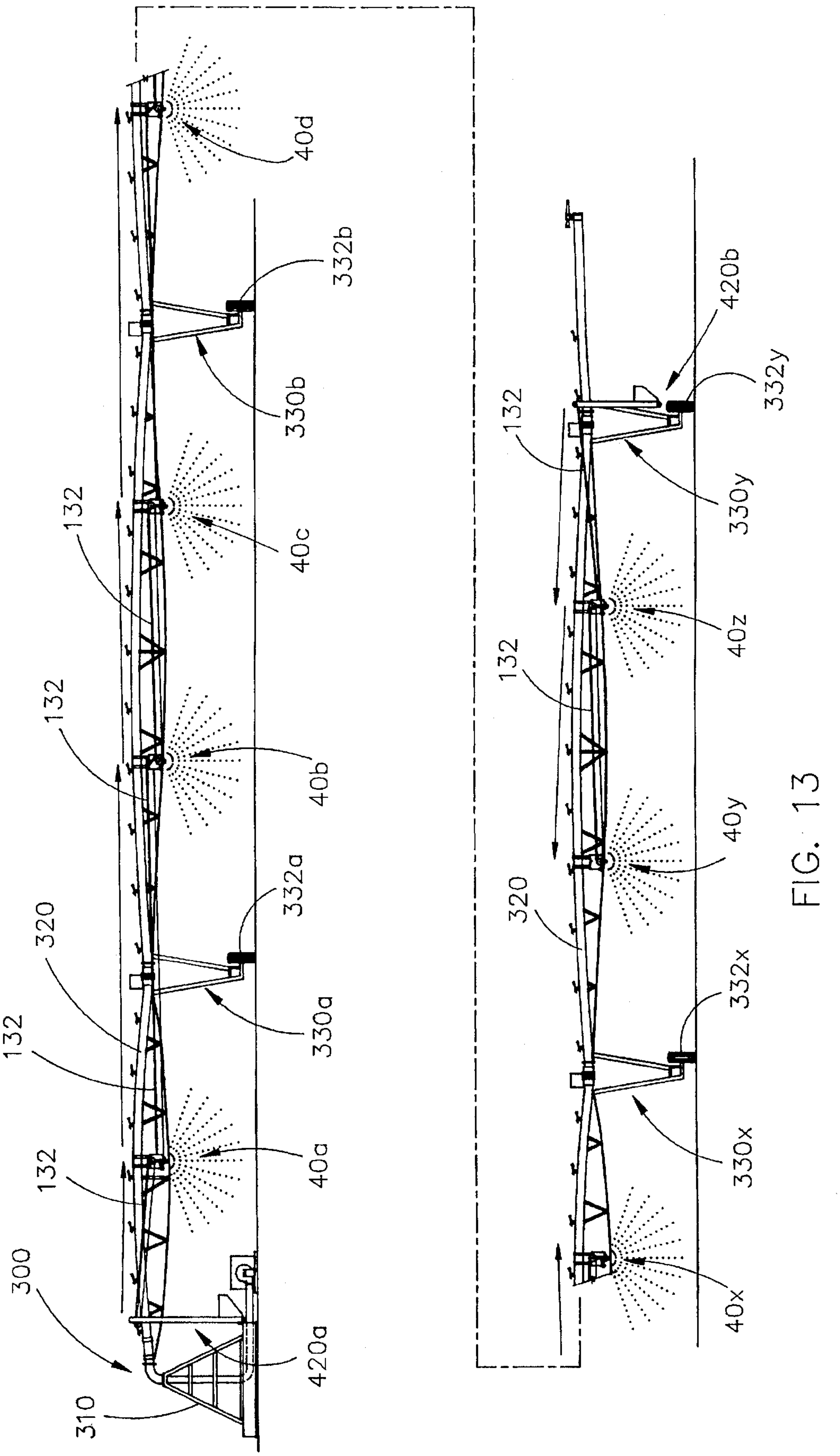
FIG. 13 is a side view of another embodiment of the interseeder apparatus of the present invention wherein the seed is conveyed from both ends of the irrigation arm.

FIG. 13 is a side view of another embodiment of the interseeder apparatus of the present invention installed on a center-pivot irrigation system. In this alternative embodiment, there are two seed storage hoppers **420*a* and 420*b* utilized to deliver seed to the various dispensing stations positioned along main pipe 320 of the center-pivot irrigation system. In this embodiment, it is anticipated that the individual seed storage hoppers 420*a* and 420*b* may be of a reduced size compared to single seed storage hopper 20 utilized in the above-described embodiments while still delivering the same amount of seed. Conversely, seed hoppers 420*a* and 420*b* may be of a size similar to seed hopper 20** of the earlier embodiment, thereby providing a great deal more seed for distribution without the need for reloading the hopper.

In the embodiment illustrated in FIG. 13, first seed storage hopper 42 would be positioned adjacent center-pivot irrigation tower 310 as was the case with single seed storage hopper 20 described above. Second seed storage hopper **420*b* would be positioned at substantially the outer end of the main water pipe as illustrated in the figure. In this embodiment, first seed storage hopper 420*a* would convey the seeds outwardly along main water pipe 320 to each succeeding dispensing station 40. Conversely, outer seed storage hopper 420*b*** would convey the seed inwardly to the dispensing stations. A mechanism (not shown) would be provided to address an overflow situation. In all other respects, the distribution of seeds from each of the station would be accomplished in the manner described above.

It is apparent that numerous other modifications and variations of the present invention are possible in view of the above teachings. For example, dry material other than seed, such as fertilizer or other soil additive, pesticide or the like, may also be dispensed using the apparatus and method of the present invention provided the material is of appropriate granular shape and size. Additionally, the number and spacing of the dispensing boxes can be varied according to the nature of the material being dispensed. Another example of a such a variation is that the pressure of the compressed air in the air assist apparatus could be adjusted to vary the spread pattern of the dispensed material.

It is to be understood that the above description is in no way intended to limit the scope of protection of the claims and it is representative of only one of several possible embodiments of the present invention.

There has thus been shown and described an invention which accomplishes at least all the stated objectives.

I claim:

1. An interseeder apparatus for dry broadcast distribution of seeds in conjunction with a center-pivot irrigation system, the center-pivot irrigation system having a center tower, a main water pipe extending radially therefrom and adapted for circular rotation about the center tower, the interseeder apparatus comprising:

a storage container for storing a quantity of dry seed to be interseeded, said storage container adapted to be mounted on a center-pivot irrigation system;

seed conveying means for conveying the seed in a dry condition from said storage container outwardly from said storage container;

a plurality of dispensing stations adapted to be positioned along the main water pipe, each of said dispensing stations having, a seed box for containing a quantity of dry seed and having a discharge opening, seed delivery means in communication with said seed conveyer means for delivering a quantity of dry seed from said seed conveyer means into said seed box from said seed conveying means; seed metering means for regulating the discharge of seed from said discharge opening of said seed box; and distribution means in communication with said seed box for receiving seed discharged through said discharge opening by said metering means and broadcasting said seed therefrom; and means for activating said seed metering means and said distribution means, such that upon activation, a quantity of dry seed is discharged from said seed box and delivered to said distribution means for broadcast distribution.

2. The interseeder apparatus of claim 1 wherein said seed conveying means comprises an auger.

3. The interseeder of claim 1 wherein said seed conveying means comprises a plurality of conveyer assemblies each having an elongated hollow tube through which the seed is conveyed, an elongated cable forming a closed loop and adapted to pass through and around said tube, a plurality of circular disks being spaced along and secured to said cable and adapted to receive a quantity of dry seed in said space between said disks, said disks having a diameter approximating the inside diameter of said tube, such that upon circulation of said cable through said tube, said disks are operative to move seed disposed therebetween through said tube.

4. The interseeder apparatus of claim 1 wherein said distribution means comprises a spinner suspended below said distribution box and having a plurality of arms extending radially from the center thereof each of said arms comprising vertical and horizontal portions defining an L-shape, said spinner being adapted to receive a quantity of seed from said seed box thereon, such that upon rotation of said spinner, said radially extending arm contacts said quantity of seed propelling it outwardly by centrifugal force.

5. The interseeder of claim 4 wherein said means for activating said distribution means comprises a motor operative to rotate said spinner.

6. The interseeder apparatus of claim 5 wherein said distribution means further comprises an air pressure means for expelling air under pressure, positioned adjacent said spinner and directed at said horizontal surface of said spinner arm such that upon rotation of said spinner by said motor, each of said arms is brought into communication with said high pressure air whereupon seeds deposited on said horizontal surface of said arms are propelled outwardly therefrom.

7. The interseeder apparatus of claim 5 wherein said dispensing station metering means includes a shutter adapted to adjustably cover said discharge opening, said means for activating said metering means including a means for adjusting the degree to which said shutter opens said discharge opening, such that seed is discharged from said box in proportion to said opening.

8. The interseeder apparatus of claim 3 wherein said seed conveying means and said seed delivery means further comprise inflow and outflow tubes and an overflow tube connecting said inflow and outflow tubes, said overflow tube being positioned at least partially within said seed box and having an opening in said overflow tube positioned to communicate a quantity of seed into said seed box until said box is filled and further such that upon said filling, said opening would be blocked causing said seed in said seed overflow tube to bypass said opening and travel to said outflow tube and onto the next dispensing station, said seed conveying means thereby permitting a sequential filling of said plurality of dispensing stations.

9. An interseeder apparatus for dry broadcast distribution of seeds in conjunction with a center-pivot irrigation system, the center-pivot irrigation system having a center tower, a main water pipe extending radially therefrom and adapted for circular rotation about the center tower, the interseeder apparatus comprising:

first and second storage containers for storing a quantity of dry seed to be interseeded, said storage containers adapted to be mounted adjacent opposite ends of a center-pivot irrigation system;

seed conveying means for conveying the seed in a dry condition from said storage containers outwardly from said first storage container and inwardly from said second storage container;

a plurality of dispensing stations positioned along the main water pipe, each of said dispensing stations having, a seed box for containing a quantity of dry seed and having a discharge opening, seed delivery means in communication with said seed conveying means for delivering a quantity of dry seed from said seed conveying means into said seed box from said seed conveying means; seed metering means for regulating the discharge of seed from said discharge opening of said seed box; and distribution means in communication with said seed box for receiving seed discharged through said discharge opening by said metering means and broadcasting said seed therefrom; and means for activating said seed metering means and said distribution means, such that upon activation, a quantity of dry seed is discharged from said seed box and delivered to said distribution means for broadcast distribution.

10. In combination, a quantity of dry seed for planting, a center-pivot irrigation system having;

a center tower, a main water pipe extending radially from said center tower and through which the water is carried, said main water pipe being movable about said center tower thereby defining a generally circular path, an interseeder apparatus for dry broadcast distribution of seeds having, a storage container for storing a quantity of dry seed to be interseeded, said storage container adapted to be mounted on a center-pivot irrigation system;

seed conveying means for conveying the seed in a dry condition from said storage container outwardly from said storage container;

a plurality of dispensing stations positioned along the main water pipe, each of said dispensing stations having, a seed box for containing a quantity of dry seed and having a discharge opening, seed delivery means in communication with said seed conveying means for delivering a quantity of dry seed from said seed conveying means into said seed box from said seed conveying means; seed metering means for regulating the discharge of seed from said discharge opening of said seed box; and distribution means in communication with said seed box for receiving seed discharged through said discharge opening by said metering means and broadcasting said seed therefrom; and means for activating said seed metering means and said distribution means, such that upon activation, a quantity of dry seed is discharged from said seed box and delivered to said distribution means for broadcast distribution.

11. A method of interseeding a crop in conjunction with the operation of a center-pivot irrigation system comprising the steps of:

providing a center-pivot irrigation system having a center tower, and a main water pipe extending radially from said center tower and through which the water is carried, said main water pipe being movable about said center tower thereby defining a generally circular path, providing an interseeder apparatus for dry broadcast distribution of said dry seeds in conjunction with said center-pivot irrigation system, the interseeder having, a storage container for storing a quantity of dry seed to be interseeded, said storage container adapted to be mounted on a center-pivot irrigation system; and a plurality of dispensing stations positioned along the main water pipe;

providing a quantity of dry seed for planting;

placing said dry seed in said storage container;

activating said irrigation system so as to pivot said main water pipe around the field;

conveying dry seed from said storage hopper to said plurality of dispensing stations; and broadcasting said dry seed from each of said dispensing stations.

12. The method of claim 11 wherein said broadcasting step comprises propelling seed outwardly with high pressure air.

* * * * *